(12) United States Patent
Horvath et al.

(10) Patent No.: US 8,985,541 B2
(45) Date of Patent: Mar. 24, 2015

(54) CABLE ROLLER, SYSTEM AND/OR METHOD FOR EXTENDING AND/OR RETRACTING A COILED CABLE

(75) Inventors: Daniel Horvath, Marseilles, IL (US); Andy Reynolds, Aurora, IL (US)

(73) Assignee: Sennco Solutions, Plainfield, IL (US)

( * ) Notice: Subject to any disclaimer, the term of this patent is extended or adjusted under 35 U.S.C. 154(b) by 587 days.

(21) Appl. No.: 12/802,644

(22) Filed: Jun. 11, 2010

(65) Prior Publication Data
US 2011/0303816 A1 Dec. 15, 2011

(51) Int. Cl.
| | | |
|---|---|---|
| A47H 1/10 | (2006.01) |
| H02G 11/02 | (2006.01) |
| B65H 75/44 | (2006.01) |
| F16M 13/02 | (2006.01) |
| H04M 1/15 | (2006.01) |

(52) U.S. Cl.
CPC ............. *H02G 11/02* (2013.01); *B65H 75/446* (2013.01); *B65H 75/4473* (2013.01); *F16M 13/022* (2013.01); *H04M 1/15* (2013.01); *B65H 2701/391* (2013.01); *F16M 2200/065* (2013.01)
USPC ........ 248/329; 248/121; 248/223.41; 248/49; 242/404; 242/379.2; 29/428

(58) Field of Classification Search
CPC ............ B66C 1/16; F16M 13/00; G09F 7/18; G09F 2007/186; A47B 81/06; B65H 75/44; B65H 75/28; B65H 27/00
USPC ........... 248/329, 328, 333, 49, 56, 59, 61, 65, 248/223.41, 224.61, 542, 406, 121, 428; 242/404, 405.3, 379.2
See application file for complete search history.

(56) References Cited

U.S. PATENT DOCUMENTS

| | | | | |
|---|---|---|---|---|
| 3,552,677 A * | 1/1971 | Hacker | .................... | 242/118.61 |
| 3,966,139 A * | 6/1976 | Terpak | ......................... | 242/118.7 |
| 4,114,736 A * | 9/1978 | Scherenberg | ................. | 191/12.4 |
| 4,384,688 A * | 5/1983 | Smith | ......................... | 242/378.2 |
| 4,993,449 A * | 2/1991 | Stutzman et al. | ......... | 137/355.26 |
| 5,072,213 A * | 12/1991 | Close | ........................... | 340/568.2 |
| 5,074,863 A * | 12/1991 | Dines | .............................. | 606/41 |
| 5,209,420 A * | 5/1993 | Simmons et al. | ............. | 242/406 |
| 5,409,180 A * | 4/1995 | Stewing | ........................ | 242/584 |
| 5,453,585 A * | 9/1995 | Lenz et al. | ............... | 191/12.2 R |
| 5,645,147 A * | 7/1997 | Kovacik et al. | ........... | 191/12.2 R |
| 5,871,171 A * | 2/1999 | Kenney et al. | .............. | 242/610.4 |
| 5,954,294 A * | 9/1999 | Forsner | ......................... | 242/604 |
| 6,039,498 A * | 3/2000 | Leyden et al. | ................... | 403/61 |
| 6,045,087 A * | 4/2000 | Vislocky et al. | .............. | 242/608.6 |
| 6,170,775 B1 * | 1/2001 | Kovacik et al. | ............... | 242/404 |
| 6,179,104 B1 * | 1/2001 | Steinmuller et al. | ...... | 191/12.2 R |

(Continued)

OTHER PUBLICATIONS

U.S. Appl. No. 12/587,749, Groth et al.

(Continued)

*Primary Examiner* — Monica Millner
(74) *Attorney, Agent, or Firm* — Patents + TMS, P.C.

(57) ABSTRACT

A cable roller, a system and/or a method extend and/or retract a coiled cable. The cable roller, the system and/or the method secure an article to a fixture while allowing manipulation, testing and/or maneuvering of the article with respect to the fixture. A drum attaches to the fixture. The drum has a sleeve that rotates freely with respect to the central axis of the drum. A spring action of the coiled cable rotates the sleeve to extend and/or to retract the coiled cable from an underside of the fixture.

14 Claims, 3 Drawing Sheets

(56) References Cited

U.S. PATENT DOCUMENTS

| | | | |
|---|---|---|---|
| 6,234,421 B1 * | 5/2001 | Cox et al. | 242/608.8 |
| 6,279,848 B1 * | 8/2001 | Mead, Jr. | 242/397.3 |
| 6,398,154 B1 * | 6/2002 | Cox et al. | 242/608.2 |
| 6,422,500 B2 * | 7/2002 | Mead, Jr. | 242/397.3 |
| 6,616,080 B1 * | 9/2003 | Edwards et al. | 242/378.1 |
| 6,831,560 B2 * | 12/2004 | Gresset | 340/568.2 |
| 6,834,820 B2 * | 12/2004 | Wei | 242/378 |
| 6,889,701 B2 * | 5/2005 | Kovacik et al. | 137/15.18 |
| 6,925,757 B2 * | 8/2005 | Priest et al. | 49/360 |
| 6,981,670 B2 * | 1/2006 | Harrington | 242/402 |
| 7,001,210 B1 * | 2/2006 | Chiang | 439/501 |
| 7,114,603 B2 * | 10/2006 | Lai | 191/12.4 |
| 7,154,039 B1 | 12/2006 | Marszalek et al. | |
| 7,202,417 B2 | 4/2007 | Marszalek et al. | |
| 7,202,786 B2 | 4/2007 | Marszalek et al. | |
| 7,216,665 B1 * | 5/2007 | Sims, Jr. | 137/355.19 |
| 7,223,917 B1 | 5/2007 | Marszalek et al. | |
| 7,387,003 B2 | 6/2008 | Marszalek et al. | |
| 7,389,955 B2 * | 6/2008 | Liao | 242/378.1 |
| 7,419,038 B2 * | 9/2008 | Caamano et al. | 191/12.2 R |
| 7,438,258 B2 * | 10/2008 | Chen | 242/614 |
| 7,487,652 B2 | 2/2009 | Marszalek et al. | |
| 7,504,944 B2 | 3/2009 | Marszalek et al. | |
| 7,592,548 B2 | 9/2009 | Marszalek et al. | |
| 7,593,142 B2 | 9/2009 | Marszalek et al. | |
| 7,626,500 B2 * | 12/2009 | Belden et al. | 340/568.1 |
| 7,714,722 B2 | 5/2010 | Marszalek et al. | |
| D616,778 S | 6/2010 | Marszalek et al. | |
| 7,874,511 B2 * | 1/2011 | Chiorgno et al. | 242/608.2 |
| 8,006,928 B2 * | 8/2011 | Caamano et al. | 242/397.3 |
| 8,167,102 B2 * | 5/2012 | Skillman | 191/12.2 R |
| 8,181,929 B2 * | 5/2012 | Fawcett et al. | 248/551 |
| 8,201,673 B2 * | 6/2012 | Caamano et al. | 191/12.2 R |
| 2001/0045484 A1 * | 11/2001 | Mead, Jr. | 242/397.3 |
| 2004/0163710 A1 * | 8/2004 | Kovacik et al. | 137/355.23 |
| 2006/0006038 A1 * | 1/2006 | Beverlin | 191/12.2 R |
| 2007/0102555 A1 * | 5/2007 | Franklin et al. | 242/404 |
| 2007/0113973 A1 | 5/2007 | Marszalek et al. | |
| 2008/0204239 A1 | 8/2008 | Marszalek et al. | |
| 2009/0058643 A1 | 3/2009 | Groth | |
| 2009/0266963 A1 | 10/2009 | Marszalek et al. | |

OTHER PUBLICATIONS

U.S. Appl. No. 12/455,096, Marszalek et al.

* cited by examiner

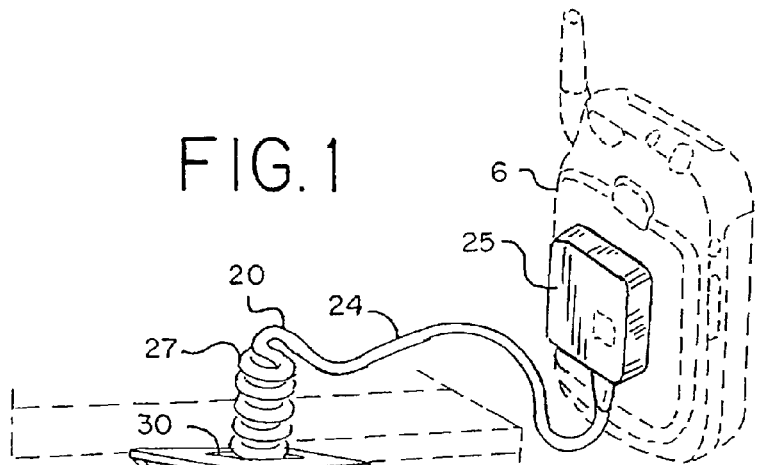
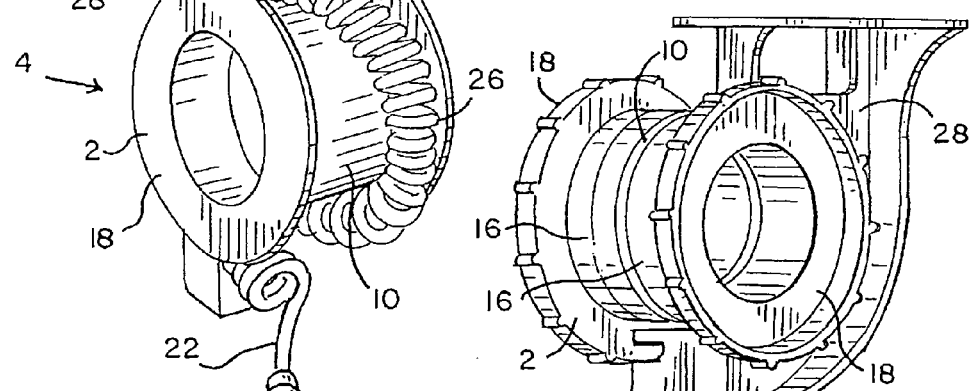
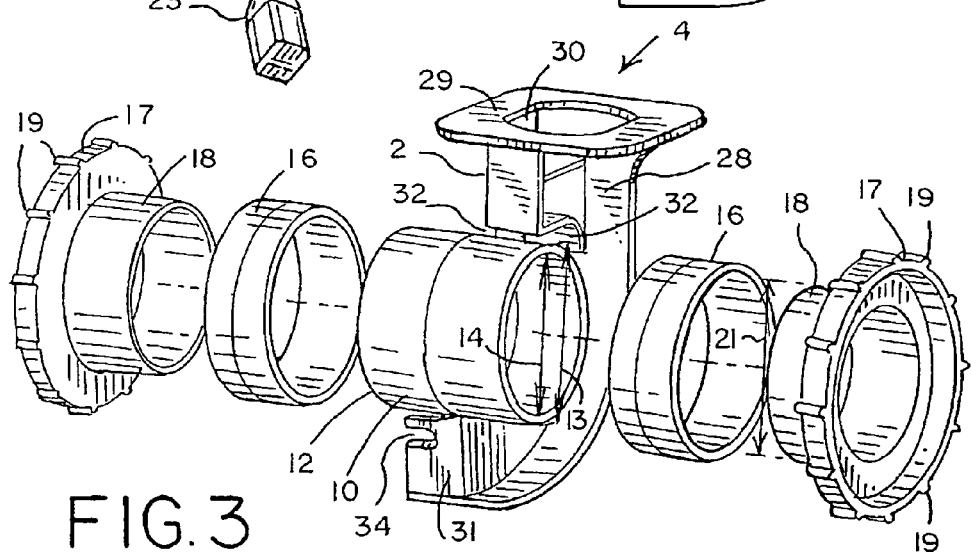

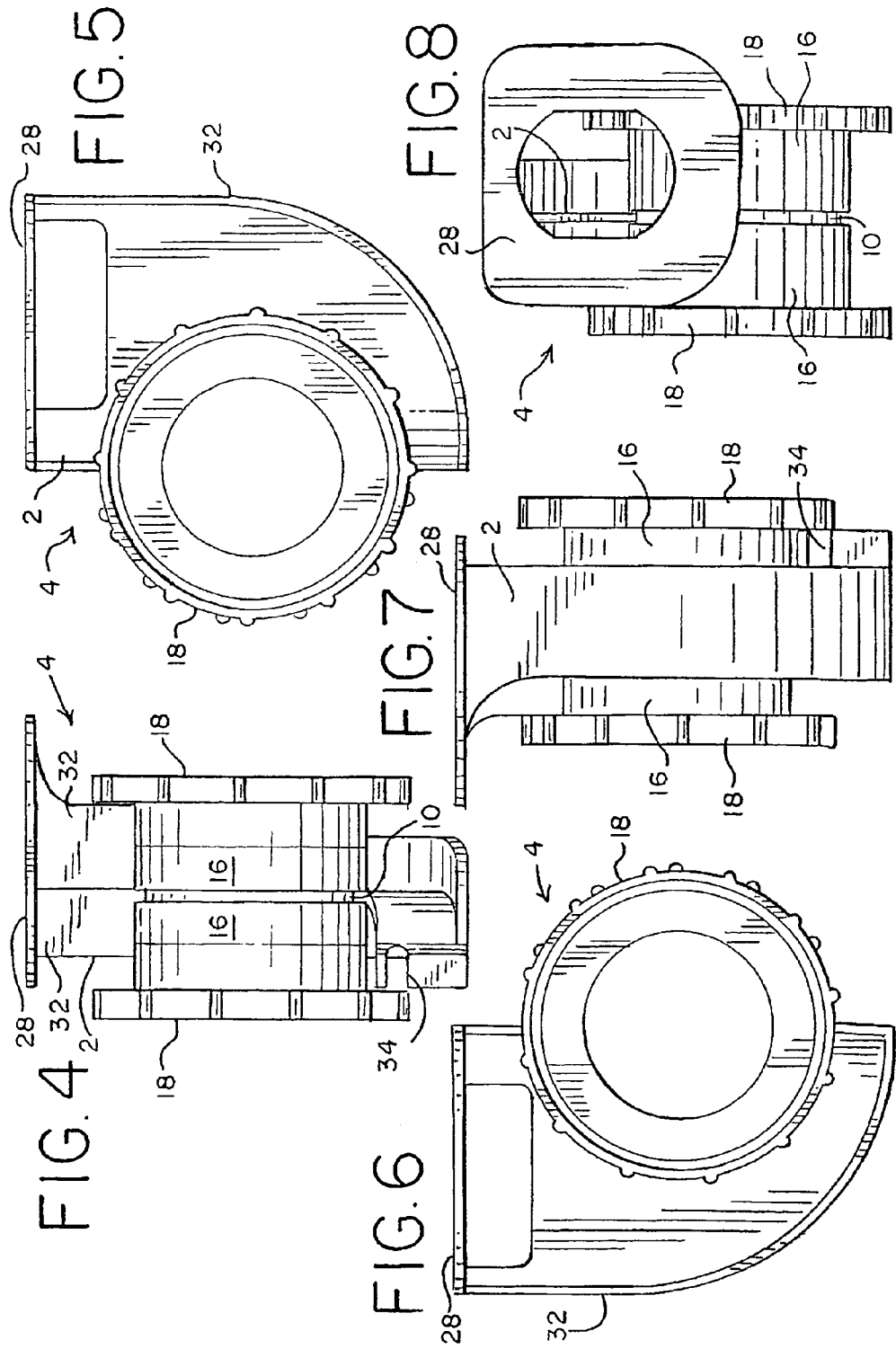

CABLE ROLLER, SYSTEM AND/OR METHOD FOR EXTENDING AND/OR RETRACTING A COILED CABLE

BACKGROUND OF THE INVENTION

The present invention generally relates to a cable roller, a system and/or a method for extending and/or retracting a coiled cable. More specifically, the present invention relates to a cable roller, a system and/or a method that may be used to allow manipulation, testing and/or maneuvering of an article with respect to a fixture. The coiled cable may be used to prevent a theft and/or a removal of an article, such as, for example, a portable electronic device from a fixture. The coiled cable may be part of an alarm apparatus that may be attached to the article. The article may be on display and/or may be used, manipulated, tested and/or transported by consumers in an environment, such as, for example, a retail store. The cable roller, the system and/or the method may allow for extension of the coiled cable by pulling the article away from the cable roller. The cable roller, the system and/or the method may allow for retraction of the coiled cable using a spring energy of the extended coiled cable. The cable roller, the system and/or the method may prevent tangling of the coiled cable and/or may allow for repetitive extension and/or retraction of the coiled cable.

It is generally known that retailers of articles provide samples of the articles that allow consumers to interact with the samples. The samples may be located on or near a display for the articles wherein pricing information and/or product availability may be displayed. Further, power connections may be provided at the display to power the samples and/or security systems associated with the samples. Data connections may be provided at the display to provide internet access and/or other like network connectivity to the samples. Moreover, security tethers may be provided at the a method for extending and/or retracting a coiled cable. Additionally, a need exists for a cable roller, a system and/or a method that may allow for extension of the coiled cable by pulling the article away from the cable roller. Further, a need exists for a cable roller, a system and/or a method that may allow for retraction of the coiled cable using a spring energy of the extended coiled cable. Still further, a need exists for a cable roller, a system and/or a method that may prevent snagging, twisting, kinking and/or tangling of the coiled cable. Still further, a need exists for a cable roller, a system and/or a method that may allow for repetitive extension and/or retraction of the coiled cable. Still further, a need exists for a cable roller, a system and/or a method that may be mountable to a surface for use where needed. Still further, a need exists for a cable roller, a system and/or a method that may be mounted under a display for an article that may secure the article to the display. Still further, a need exists for a cable roller, a system and/or a method that may provide a minimalistic aesthetic quality to a display for securing an article. Still further, a need exists for a cable roller, a system and/or a method that may have interchangeable components to allow for customization of a security solution. Still further, a need exists for a cable roller, a system and/or a method that may be adapted for use with existing security systems that utilize coiled cables. Still further, a need exists for a cable roller, a system and/or a method that may allow the coiled cable to be quickly installed, replaced and/or exchanged. Still further, a need exists for a cable roller, a system and/or a method that may accommodate various sizes of coiled cables. Moreover, a need exists for a cable roller, a system and/or a method that may prevent friction wear on a jacket of the coiled cable.

SUMMARY OF THE INVENTION

The present invention generally relates to a cable roller, a system and/or a method for extending and/or retracting a coiled cable. More specifically, the present invention relates to a cable roller, a system and/or a method that may be used to secure an article to a fixture while allowing manipulation, testing and/or maneuvering of the article with respect to the fixture.

The cable roller, the system and/or the method may have a drum that is attachable to the fixture. The drum may be generally cylindrical about a central axis of the drum. The drum may have a sleeve that may fit over the drum. The sleeve may rotate freely with respect to the central axis of the drum. A coiled cable having a first end and a second end that may be opposite to the first end may be positioned adjacent to the sleeve and may be wrapped around the drum. The drum may have a slot for attaching the first end of the coiled cable to the drum. The coiled cable may be wrapped, for example, at least one revolution around the drum and/or the sleeve. The second end of the coiled cable may extend from the drum towards and/or through the fixture where the drum may be attached to the fixture. The second end of the coiled cable may have a sensor for monitoring a connection of the article to the fixture. The first end of the coiled cable may be mechanically and/or electrically connected to an alarm system for monitoring the connection of the article to the fixture.

A user may maneuver the article away from the cable roller. By pulling on the article, the coiled cable that may be attached to the article may extend and may rotate the sleeve as the coiled cable may be extended. When the user may maneuver the article towards the cable roller and/or may release the article, a spring energy stored during an extension of the coiled cable may draw the first end of the coiled cable and/or the article towards the cable roller. The sleeve may rotate freely around the drum to allow the coiled cable to be retracted into the fixture and onto the drum. As a result, excess amounts of the coiled cable may be stored on the drum when the article is not being manipulated, tested and/or maneuvered by the user.

To this end, in an embodiment of the present invention, a cable roller for retracting a coiled cable into a fixture wherein the fixture has a top surface and a bottom surface wherein the bottom surface is positioned opposite to the top surface is provided. The cable roller has a drum having a central axis wherein the drum has a length defined between a first end and a second end wherein the drum has an internal diameter and an external diameter defining a thickness. Further, the cable roller has a mounting bracket extending from the drum at a junction point between the first end of the drum and the second end of the drum wherein the mounting bracket has a top end and a bottom end. Moreover, the cable roller has a first end cap having a length defined between a first end and a second end wherein the first end cap has a flange that extends radially from the first end of the first end cap wherein the second end of the first end cap has an external diameter that is less than the internal diameter of the drum wherein the second end of the first end cap inserts into the first end of the drum wherein the flange prevents removal of the coiled cable from the drum.

In an embodiment, the cable roller has a sleeve around the drum between the first end of the drum and the junction point wherein the sleeve has an internal diameter that is greater than the external diameter of the drum wherein the sleeve rotates around the drum.

In an embodiment, the cable roller has a sleeve around the drum between the second end of the drum and the junction point wherein the sleeve has an internal diameter that is greater than the external diameter of the drum wherein the sleeve rotates around the drum.

In an embodiment, the drum has a low friction surface.

In an embodiment, the cable roller has a second end cap that inserts into the second end of the drum.

In an embodiment, the cable roller has a slot in the mounting bracket wherein the slot is sized to seat the coiled cable.

In an embodiment, the cable roller has an aperture in the mounting bracket wherein the aperture forms a passage for the coiled cable.

In an embodiment, the cable roller has means for attaching the mounting bracket to the fixture.

In an embodiment, the cable roller has a post assembly that attaches to the mounting bracket wherein the post assembly is positioned adjacent to the fixture and further wherein the mounting bracket is positioned adjacent to the fixture.

In an embodiment, the cable roller has a connector that attaches the post assembly to the mounting bracket.

In an embodiment, the cable roller has a rib extending from the flange wherein the rib forms a grip to remove the first end cap from the drum.

In another embodiment, a system for securing an article to a fixture wherein the fixture has a top surface and a bottom surface wherein the fixture has a hole that extends between the top surface and the bottom surface is provided. The system has a cable roller positioned adjacent to the hole on the bottom surface of the fixture wherein the cable roller has a fixed drum and a mounting bracket wherein the mounting bracket extends from the fixed drum wherein the mounting bracket is disposed around the fixed drum and further wherein the mounting bracket has an aperture that is aligned with the hole in the fixture wherein the mounting bracket has a slot. Further, the system has a post positioned adjacent to the hole on the top surface of the fixture wherein the post is hollow wherein the post is sized to position the article away from the top surface of the fixture wherein the post is attached to the cable roller through the hole in the fixture. Moreover, the system has a coiled cable that extends through the post, through the hole in the fixture, through the aperture in the mounting bracket and around the fixed drum and is seated in the slot of the mounting bracket.

In an embodiment, the system has a sensor on the coiled cable wherein the sensor is attachable to the article.

In an embodiment, the system has an alarm unit associated with the fixture wherein the coiled cable is connected to the alarm unit to monitor the article.

In an embodiment, the system has a sleeve around the fixed drum wherein the sleeve rotates around the fixed drum as the coiled cable is extended with respect to the fixed drum.

In an embodiment, the system has a flange extending radially from the fixed drum to prevent lateral movement of the coiled cable with respect to the fixed drum.

In an embodiment, the system has a low-friction surface on the fixed drum to allow extension of the coiled cable with respect to the fixed drum.

In another embodiment, a method for securing an article to a fixture is provided. The method has the step of providing a coiled sensor cable and a cable roller wherein the coiled sensor cable has a first end and a second end wherein the cable roller has a fixed drum, a mounting bracket, a rotatable sleeve and a flanged end cap wherein the mounting bracket has a slot sized to receive the first end of the coiled sensor cable. Further, the method has the step of attaching the cable roller to the fixture with the mounting bracket. Still further, the method has the step of threading the first end of the coiled sensor cable through the fixture and around the fixed drum. Still further, the method has the step of attaching the first end of the coiled sensor cable to the mounting bracket via the slot. Moreover, the method has the step of attaching the second end of the coiled sensor cable to the article.

In an embodiment, the method has the step of positioning the rotatable sleeve between the fixed drum and the coiled sensor cable.

In an embodiment, the method has the step of inserting the flanged end cap into the fixed drum.

It is, therefore, an advantage of the present invention to provide a cable roller, a system and/or a method for extending and/or retracting a coiled cable.

Another advantage of the present invention is to provide a cable roller, a system and/or a method for extending and/or retracting a coiled cable that may be used to allow manipulation, testing and/or maneuvering of an article with respect to a fixture.

And, another advantage of the present invention is to provide a cable roller, a system and/or a method for extending and/or retracting a coiled cable that may be used to prevent a theft and/or a removal of an article, such as, for example, a portable electronic device from a fixture.

Yet another advantage of the present invention is to provide a cable roller, a system and/or a method for extending and/or retracting a coiled cable that may be part of an alarm apparatus for monitoring an article.

A further advantage of the present invention is to provide a cable roller, a system and/or a method for extending and/or retracting a coiled cable that may allow for extension of the coiled cable while displacing the article away from the cable roller.

Moreover, an advantage of the present invention is to provide a cable roller, a system and/or a method for extending and/or retracting a coiled cable that may allow for retraction of the coiled cable using a spring energy of the extended coiled cable.

And, another advantage of the present invention is to provide a cable roller, a system and/or a method for extending and/or retracting a coiled cable that may prevent snagging, twisting, kinking and/or tangling of the coiled cable.

Yet another advantage of the present invention is to provide a cable roller, a system and/or a method for extending and/or retracting a coiled cable that may allow for repetitive extension and/or retraction of the coiled cable.

Another advantage of the present invention is to provide a cable roller, a system and/or a method for extending and/or retracting a coiled cable that may be mountable to a surface for use where needed.

Yet another advantage of the present invention is to provide a cable roller, a system and/or a method for extending and/or retracting a coiled cable that may be mounted under a display for an article that may secure the article to the display.

A still further advantage of the present invention is to provide a cable roller, a system and/or a method for extending and/or retracting a coiled cable that may provide a minimalistic aesthetic quality to a display for securing an article.

Moreover, an advantage of the present invention is to provide a cable roller, a system and/or a method for extending and/or retracting a coiled cable that may have interchangeable components to allow for customization of a security solution.

And, another advantage of the present invention is to provide a cable roller, a system and/or a method for extending and/or retracting a coiled cable that may be adapted for use with existing security systems that utilize coiled cables.

Yet another advantage of the present invention is to provide a cable roller, a system and/or a method for extending and/or retracting a coiled cable that may allow the coiled cable to be quickly installed, replaced and/or exchanged.

Moreover, an advantage of the present invention is to provide a cable roller, a system and/or a method for extending and/or retracting a coiled cable that may accommodate various sizes of coiled cables.

And, another advantage of the present invention is to provide a cable roller, a system and/or a method for extending and/or retracting a coiled cable that may prevent friction wear on a jacket of the coiled cable.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of a cable roller and a system for extending and/or retracting a coiled cable in an embodiment of the present invention.

FIG. 2 illustrates a perspective view of a cable roller and a system for extending and/or retracting a coiled cable in an embodiment of the present invention.

FIG. 3 illustrates an exploded view of a cable roller and a system for extending and/or retracting a coiled cable in an embodiment of the present invention.

FIG. 4 illustrates a front plan view of a cable roller and a system for extending and/or retracting a coiled cable in an embodiment of the present invention.

FIG. 5 illustrates a right side plan view of a cable roller and a system for extending and/or retracting a coiled cable in an embodiment of the present invention.

FIG. 6 illustrates a left side plan view of a cable roller and a system for extending and/or retracting a coiled cable in an embodiment of the present invention.

FIG. 7 illustrates a back plan view of a cable roller and a system for extending and/or retracting a coiled cable in an embodiment of the present invention.

FIG. 8 illustrates a top plan view of a cable roller and a system for extending and/or retracting a coiled cable in an embodiment of the present invention.

DETAILED DESCRIPTION OF THE PRESENTLY PREFERRED EMBODIMENTS

Figure 9:
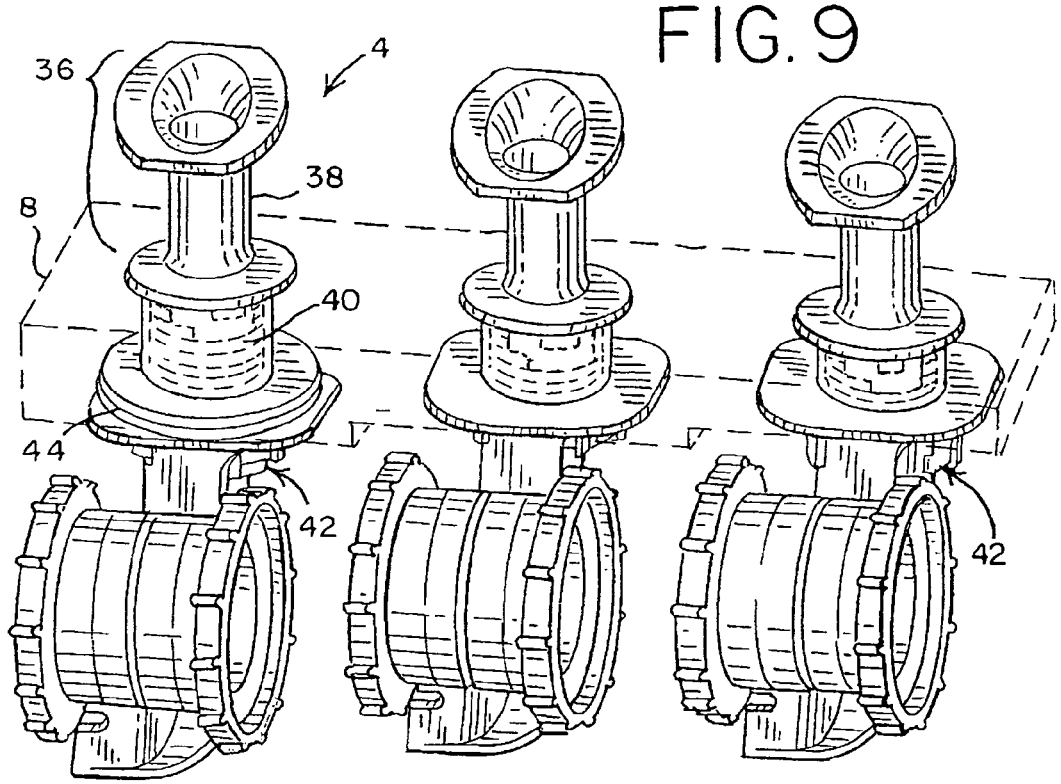
FIG. 9 illustrates a perspective view of cable rollers and systems for extending and/or retracting a coiled cable in an embodiment of the present invention.

The present invention generally relates to a cable roller, a system and/or a method for extending and/or retracting a coiled cable. More specifically, the present invention relates to a cable roller, a system and/or a method that may be used to secure an article to a fixture while allowing manipulation, testing and/or maneuvering of the article with respect to the fixture.

Referring now to the drawings wherein like numerals refer to like parts, FIGS. 1-10 illustrate a cable roller 2, a system 4 and/or components of the cable roller 2 and/or of the system 4 for extending and/or retracting a coiled cable 20. The cable roller 2 and/or the system 4 may be attached to a fixture 8 for displaying an article 6 and/or for securing the article 6 to the fixture 8 in embodiments of the present invention. In an embodiment, the article 6 may be a portable electronic device, such as, for example, a laptop computer, a tablet computer, a portable hard drive, a peripheral computer device, a printer, a television, a computer monitor, a cellular telephone, an mp3 player, a camera, a camcorder, a personal digital assistant (PDA), a gaming device, a handheld global positioning system (GPS), a satellite radio, a remote control and/or the like. The article 6 may be on display and/or may be used, manipulated, tested and/or transported by a consumer or consumers in an environment, such as, for example, a retail store. The present invention should not be deemed as limited to a specific embodiment of the article 6. It should be understood that the article 6 may be any article that may be sold and/or displayed in an environment offering any article, product and/or other merchandise as known to one having ordinary skill in the art.

The coiled cable 20 may be part of a security assembly for tethering the article 6 to the fixture 8 and/or for monitoring an attachment of the article 6 to the security assembly. The coiled cable 20 may have a length defined between a first end 22 and a second end 24 that may be positioned opposite to the first end 22. The first end 22 of the coiled cable 20 may have a plug 23, such as, for example, a registered jack connector, an electrical plug, a USB plug and/or the like for electrically and/or mechanically connecting the coiled cable 20 to an alarm system (not shown). The second end 24 of the coiled cable 20 may have a sensor 25, such as, for example, a plunger sensor that may be attached to the article 6.

The coiled cable 20 may have a coil 26 located between the first end 22 and the second end 24. As shown in FIG. 1, the coil 26 may have a spiral configuration. Extending the coiled cable 20 by pulling on the second end 24 may decompress the coil 26 and may store mechanical energy in the coil 26. When the coiled cable 20 is extended and then released, the coil 26 may re-compress to displace the second end 24 to an original position. The coiled cable 20 may have, for example, electrical wires and/or mechanical tethering wires disposed within a cable jacket 27, such as, for example, a plastic insulating sheath. The spiral configuration, the cable jacket 27, the electrical wires and/or the mechanical wires may act as a spring during extension that may be pre-disposed to displace the second end 24, the sensor 25 and/or the article 6 to the original position after extension and/or release of the coiled cable 20. The present invention should not be deemed as limited to a specific embodiment of the coiled cable 20, the coil 26, the plug 23, the sensor 25 and/or the jacket 27. It should be understood that the coiled cable 20, the coil 26, the plug 23, the sensor 25 and/or the jacket 27 may be any coiled cable, coil, plug, sensor and/or jacket, respectively, that may be used to secure the article 6 to the fixture 8 and/or the security alarm as known to one having ordinary skill in the art.

FIGS. 1-10 generally illustrate embodiments of the cable roller 2 and/or the system 4. As shown in FIG. 3, the cable roller 2 may have a drum 10 that may have a length defined between a first end 12 and a second end 14 that may be positioned opposite to the first end 12. The drum 10 may be cylindrical about a central axis of the drum 10 between the first end 12 and the second end 14. The drum 10 may have an internal diameter 11 and an external diameter 13. The drum 10 may be attached to and/or may be integrally formed with a mounting bracket 28 at a junction point that may be approximately half way between the first end 12 of the drum 10 and the second end 14 of the drum 10. The mounting bracket 28 may be used to attach the drum 10 to the fixture 8. The drum 10 and/or the mounting bracket 28 may be constructed from a material, such as, for example, steel, aluminum, plastic and/or the like that may be suitable to secure the article 6 to the fixture 8.

In an embodiment, as shown in FIG. 3, the cable roller 2 and/or the system 4 may have a sleeve 16 that may be cylindrical and/or that may have an internal diameter 7. The internal diameter 7 of the sleeve 16 may be greater than the external diameter 13 of the drum 10. The sleeve 16 may be sized for positioning over the drum 10 between the first end 12 of the drum 10 and the junction point. As shown in FIG. 3, the cable roller 2 and/or the system 4 may have an additional sleeve 16. The additional sleeve 16 may be sized for positioning over the drum 10 between the second end 14 of the drum 10 and the junction point. The sleeve 16 may be sized to allow the sleeve 16 to rotate freely around the central axis of the drum 10 with little and/or no frictional resistance between the drum 10 and the sleeve 16. The sleeve 16 may be constructed from a material, such as, for example, steel, aluminum, plastic and/or the like that may be suitable to rotate about the central axis of the drum 10 with little and/or no frictional resistance between the drum 10 and the sleeve 16.

As shown in FIG. 3, the cable roller 2 and/or the system 4 may have end caps 18 that may be cylindrical and/or that may have an external diameter 21. The end caps 18 may have a first end 18f and a second end 18s that may be positioned opposite to the first end 18f. The end caps 18 may have a flange 17 that may extend radially from the end caps 18 at the first end 18f of the end caps 18. The external diameter 21 of the end caps 18 at the second end 18s may be less then the internal diameter 11 of the drum 10 which may allow for insertion of the second end 18s into the first end 12 and/or the second end 14 of the drum 10. The end caps 18 may be sized to provide frictional attachment of the end caps 18 to the drum 10. The flanges 17 may prevent the coiled cable 20 from slipping from the first end 12 or the second end 14 of the drum 10. In an embodiment, as shown in FIG. 2, the flanges 17 may have ribs 19 that may allow a user of the cable roller 2 and/or the system 4 to grab, to twist and/or the displace the end caps 18. The end caps 18 may be constructed from a material, such as, for example, steel, aluminum, plastic and/or the like. However, the end caps 18 may be constructed from any material that may be suitable to press fit the end caps 18 into the drum 10. The end caps 18 may mate securely with the drum 10 to avoid removal and/or displacement while operating the cable roller 2 and/or the system 4. The end caps 18 may be removed from the drum 10 by hand for replacement and/or for adjustment of the coiled cable 20.

FIGS. 2-8 generally illustrate the mounting bracket 28 that may be defined between a top end 29 and a bottom end 31. The mounting bracket 28 may extend around the drum 10 between the top end 29 of the mounting bracket 28 and the bottom end 31 of the mounting bracket 28. The mounting bracket 28 may be attached to and/or integrally formed with the drum 10 at the junction point between the top end 29 of the mounting bracket 28 and the bottom end 31 of the mounting bracket 28. As shown in FIGS. 2-8, the mounting bracket 28 may have rails 32 that may extend parallel to the drum 10. The rails 32 may provide structural strength and/or may guide the coiled cable 20 during operation of the cable roller 2 and/or the system 4. In an embodiment, as shown in FIG. 4, the bottom end 31 of the mounting bracket 28 may have a slot 34. A portion of the coil 26 may be seated within the slot 34 to prevent removal of the first end 22 of the coiled cable 20 from the drum 10 during operation of the cable roller 2 and/or the system 4. The top end 29 of the mounting bracket 28 may have an aperture 30 that may be sized to allow the coiled cable 20 to pass therethrough.

As shown in FIG. 9, the top end 29 of the mounting bracket 28 may be positioned adjacent to an underside of the fixture 8. The top end 29 of the mounting bracket 28 may be affixed to the fixture 8 by, for example, fasteners, adhesives and/or the like. In a preferred embodiment, the cable roller 2 and/or the system 4 may be attached to the fixture 8 by attaching a post assembly 36 through a hole in the fixture 8 to the top end 29 of the mounting bracket 28. The aperture 30 of the mounting bracket 28 may be sized to receive, for example, a National Pipe Thread piece 40 (hereinafter "the NPT piece 40"). The NPT piece 40 may extend through the hole in the fixture 8. The post assembly 36 may have a post 38 to elevate the coiled cable 20, the sensor 25 and/or the article 6 above the fixture 8. The post assembly 36 may be configured to center, to receive and/or to seat the sensor 25 to hold the article 6 adjacent to the post 38. The post 38 may have a threaded nut 42 which may be tightened onto the NPT piece to sandwich the fixture 8 between the mounting bracket 28 and the post 38. The threaded nut 42 together with the NPT piece may hold the cable roller 2 and/or the post assembly 36 on the fixture 8. In an embodiment, a spacer 44 may be provided between the top end 29 of the mounting bracket 28 and the bottom side of the fixture 8 to adjust a distance between the post assembly 36 and the mounting bracket 28. In an embodiment, the post 38 may be hollow. The first end 22 of the coiled cable 20 may extend from the cable roller 2 through the aperture 30 in the mounting bracket 28, through the fixture 8 and/or through the post 38 to the article 6.

A user of the cable roller 2 and/or the system 4 may install and/or may use the cable roller 2 and/or the system 4 on the fixture 8 in several ways. In an embodiment, the top end 29 of the mounting bracket 28 may be affixed adjacent to the hole in the fixture 8 on the bottom side of the fixture 8 with a fastener, such as, for example, a screw, an adhesive and/or the like. In a preferred embodiment, the top end 29 of the mounting bracket 28 may be positioned adjacent to the hole in the fixture 8 on the bottom side of the fixture 8. The NPT piece 40 which may be attached to the aperture 30 of the mounting bracket 28 may be inserted into the hole in the fixture 8. The post assembly 36 may be positioned adjacent to, the hole in the fixture 8 on the top side of the fixture 8. The threaded nut 42 may be tightened onto the NPT piece 40 to attach the post assembly 36 to the mounting bracket 28 through the fixture 8.

After the cable roller 2 is attached to the fixture 8, the first end 22 of the coiled cable 20 may be inserted through the post 38 and/or through the hole in the fixture 8. The first end 22 of the coiled cable 20 may be wrapped around the drum 10, as shown in FIG. 1. The user may adjust slack in the coiled cable 20. The coil 26 may be seated into the slot 34 to hold the first end 22 of the coiled cable 20 on the drum 10. The end caps 18 may be pressed into the first end 12 and the second end 14 of the drum 10. The flanges 17 of the end caps 18 may prevent the coiled cable 20 from sliding laterally from the drum 10. The plug 23 may be connected to the alarm system and/or the sensor 25 may be affixed to the article 6.

After the cable roller 2, the system 4, the coiled cable 20 and/or the article 6 are installed, the user may maneuver the article 6 with the sensor 25 with respect to the fixture 8. As the article 6 is displaced from the cable roller 2, the coiled cable 20 may extend and/or may feed from the sleeve 16 through the hole in the fixture 8 and/or through the post 38. As the coiled cable 20 may extend, the sleeve 16 may rotate around the central axis of the drum 10 to assist in extension of the second end 20 of the coiled cable 20 from the fixture 8. When the article 6 is displaced towards the cable roller 2 and/or released, a spring action of the coil 26 may retract the coiled cable 20 into the fixture 8 and onto the sleeve 16 and/or the drum 10. During retraction, the sleeve 16 may rotate to assist in retracting the second end 24 of the coiled cable 20 towards the fixture 8 and/or onto the post assembly 36. In an alternate embodiment, as shown in FIG. 1, the cable roller 2 and/or the system 4 may be provided without the sleeve 16 around the drum 10. The drum 10 may be manufactured with and/or treated to have a low friction surface between the coiled cable 20 and the drum 10. As a result, the spring action of the coil 26 may retract the coiled cable 20 into the fixture 8 and onto the drum 10 without requiring moving parts, such as, for example, the sleeve 16.

To remove and/or to replace the coiled cable 20, the plug 23 may be disconnected from the alarm system. The end caps 18 may be removed from the first end 12 and the second end 14 of the drum 10. The coil 26 may be unseated from the slot 34, and the coiled cable 20 may be removed from the drum 10. The user may replace the coiled cable 20 as discussed herein above.

Figure 10:
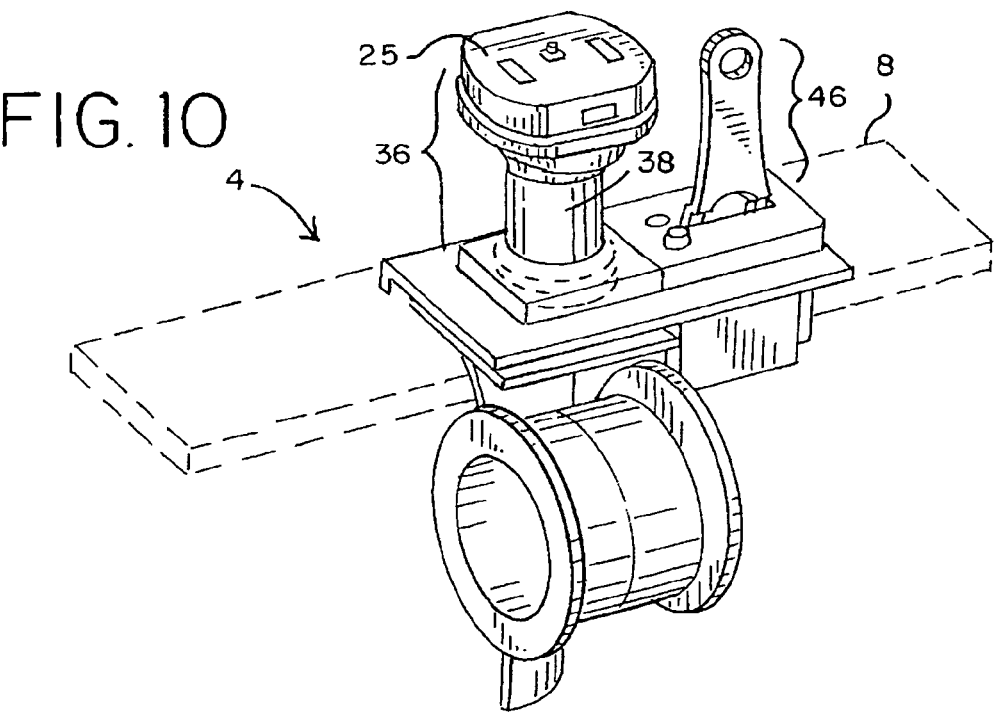
FIG. 10 illustrates a perspective view of a cable roller and a system for extending and/or retracting a coiled cable in an embodiment of the present invention.

In an embodiment, as shown in FIG. 10, an alarm key assembly 46 may be provided on the top surface of the fixture 8 adjacent to the post assembly 36. The alarm key assembly 46 may be used to program and/or to control an alarm state of the alarm system.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A cable roller for retracting a coiled cable into a fixture wherein the fixture has a top surface and a bottom surface wherein the bottom surface is positioned opposite to the top surface, the cable roller comprising:
   a drum having a central axis, a length defined between a first end and a second end, a thickness defined between an internal diameter and an external diameter, a junction ring defined at an external circumference of the drum at a point between the first end of the drum and the second end of the drum, and a junction point along the junction ring;
   a mounting bracket having a wall defined by a top end and a bottom end wherein the wall is affixed to the junction point and further wherein the coiled cable encircles the drum and intersects the junction ring and further wherein the wall prevents overlap of the coiled cable;
   a first end cap having a length defined between a first end and a second end wherein the first end cap has a flange that extends radially from the first end of the first end cap wherein the second end of the first end cap has an external diameter that is less than the internal diameter of the drum wherein the second end of the first end cap inserts into the first end of the drum; and
   a sleeve around the drum between the first end of the drum and the junction point wherein the sleeve has an internal diameter that is greater than the external diameter of the drum wherein the sleeve rotates around the drum.

2. A cable roller for retracting a coiled cable into a fixture wherein the fixture has a top surface and a bottom surface wherein the bottom surface is positioned opposite to the top surface, the cable roller comprising:
   a drum having a central axis, a length defined between a first end and a second end, a thickness defined between an internal diameter and an external diameter, a junction ring defined at an external circumference of the drum at a point between the first end of the drum and the second end of the drum, and a junction point along the junction ring;
   a mounting bracket having a wall defined by a top end and a bottom end wherein the wall is affixed to the junction point and further wherein the coiled cable encircles the drum and intersects the junction ring and further wherein the wall prevents overlap of the coiled cable;
   a first end cap having a length defined between a first end and a second end wherein the first end cap has a flange that extends radially from the first end of the first end cap wherein the second end of the first end cap has an external diameter that is less than the internal diameter of the drum wherein the second end of the first end cap inserts into the first end of the drum; and
   a sleeve around the drum between the second end of the drum and the junction point wherein the sleeve has an internal diameter that is greater than the external diameter of the drum wherein the sleeve rotates around the drum.

3. The cable roller of claim 1 wherein the drum has a low friction surface.

4. The cable roller of claim 1 further comprising:
   a second end cap that inserts into the second end of the drum.

5. The cable roller of claim 1 further comprising:
   a slot in the mounting bracket wherein the slot is sized to seat the coiled cable.

6. The cable roller of claim 1 further comprising:
   an aperture in the mounting bracket wherein the aperture forms a passage for the coiled cable.

7. The cable roller of claim 1 further comprising:
   means for attaching the mounting bracket to the fixture.

8. The cable roller of claim 1 further comprising:
   a post assembly that attaches to the mounting bracket wherein the post assembly is position adjacent to the fixture and further wherein the mounting bracket is positioned adjacent to the fixture.

9. The cable roller of claim 8 further comprising:
   a connector that attaches the post assembly to the mounting bracket.

10. The cable roller of claim 1 further comprising:
    a rib extending from the flange wherein the rib forms a grip to remove the first end cap from the drum.

11. A method for securing an article to a fixture, the method comprising the steps of:
    providing a coiled sensor cable and a cable roller wherein the coiled sensor cable has a first end and a second end wherein the cable roller has a fixed drum;
    attaching a mounting bracket to the fixed drum;
    attaching the cable roller to the fixture with the mounting bracket;
    threading the first end of the coiled sensor cable through the fixture and around the fixed drum wherein the cable encircles the fixed drum on each side of the mounting bracket without overlap of the cable;
    anchoring the coiled sensor cable to the mounting bracket at a point between the first end of the coiled sensor cable and the second end of the coiled sensor cable;
    attaching the first end of the coiled sensor cable to the fixture; and
    attaching the second end of the coiled sensor cable to the article.

12. The method of claim 11 further comprising the step of:
    positioning a rotatable sleeve between the fixed drum and the coiled sensor cable.

13. The method of claim 11 further comprising the step of:
    attaching an end cap to the fixed drum.

14. The cable roller of claim 2 further comprising:
    a second end cap that inserts into the second end of the drum.

* * * * *